United States Patent Office 3,163,549
Patented Dec. 29, 1964

---

3,163,549
PROCESS FOR PREPARING AN ADHESIVE
Willard L. Vollink, Battle Creek, Mich., and Kenneth R. Hunt, Kankakee, Ill., assignors to General Foods Corporation, White Plains, N.Y., a corporation of Delaware
No Drawing. Filed June 22, 1961, Ser. No. 118,776
9 Claims. (Cl. 106—124)

This invention relates to a composition of matter adapted for use as an adhesive, as well as a novel process for preparing the composition of matter. More particularly, the invention pertains to a product and process for manufacturing same, the product being particularly adapted for use in adhering cellulosic plies to each other to form a stable, corrugated article.

A process for the manufacture of corrugated articles using an adhesive formed from starch is in widespread practice in the corrugated paper industry at the present time. This process, commonly known as the Stein-Hall process, and the equipment utilized to practice the process on a commercial scale are specifically designed for the use of raw corn starch. Generally, this process entails the gelatinization of a minor portion, usually about one-sixth, of the total quantity of starch to be used. This portion of starch is gelatinized with water and sodium hydroxide to form a viscous heavy carrier. The carrier portion is subsequently blended with the major portion, usually about five-sixth of the total starch, comprising ungelatinized raw starch. The blend of gelatinized and ungelatinized starch is applied to paper at the corrugator, and heat is then immediately applied to the blend to gelatinize the raw starch and form the desired bond between the inner ply of corrugated paper and the two substantially planar sheets.

Other adhesives have been used in the manufacture of corrugated board, but none of these adhesives has met with marked commercial success in recent years. Such lack of success can be attributed in part to the reluctance of boxboard manufacturers to invest in new equipment to replace their present equipment which produces a satisfactory product. Attempts to use grain flours, e.g., corn flour, as a complete replacement for the corn starch presently used have not been successful. When flour is substituted in toto for starch in the carrier portion of the adhesive, the subsequent blend has a much higher initial viscosity than a blend formulated from pearl starch adhesive alone. Furthermore, when the adhesive blend is allowed to stand without agitation for even relatively short periods of time, it coagulates into a thick, thixotropic gel, such gelation being referred to as "set back." Formation of a thixotropic gel reduces the ability of the adhesive to flow and fouls the corrugator by building up deposits of gelled adhesive on the adhesive applicator parts of the boxboard manufacturing equipment. While pearl starch adhesive is also thixotropic, the degree of thixotropy of a flour adhesive is much greater than that of a starch adhesive. In order to prevent "set back" and decrease the viscosity of a flour adhesive such as that formed from corn flour, it is necessary to reduce substantially the proportion of the gelatinized or carrier portion in the final blend. Such a reduction results in a substantial lessening of the viscosity of the blend. As a result, the blend is easily drawn from the rolls used to apply the adhesive. If the viscosity or thixotropic character is too low, waste and unsatisfactory bonding occur due to a scattered adhesive pattern on the paper.

Even with the disadvantages attendant upon the use of flour, there have been intermittent efforts made by the adhesive industry to produce an adhesive adapted for use in manufacturing corrugated structures and in which flour can be substituted for starch. These efforts have continued primarily because flour, particularly corn flour, has a substantial economic advantage when compared to a starch such as pearl corn starch. It is, therefore, an important object of the present invention to provide a more economical adhesive which can be utilized with equipment presently used in the manufacture of boxboard without requiring any modification of that equipment.

It is a more specific object of the present invention to provide an adhesive for use in boxboard manufacture and a process for preparing same, which adhesive includes flour as a replacement in toto for the starch presently utilized in similar adhesives.

Our invention results from the discovery that an important factor in the failure of flour adhesives to meet specifications required for use in the corrugated boxboard equipment is that protein in the flour imparts detrimental properties to the adhesives which render their performance unsatisfactory. These properties, which are thixotropic in nature, cause the adhesives to set up in the adhesive pans, to plug up pipe lines and to foul the corrugator. All grain flours contain protein and the amount varies depending on the source of the flour. While there are methods which eliminate the protein fraction of the flour, such as by precipitation with various reagents, e.g., lactic acid, sodium chloride, sodium acetate, sodium trisulfide, and sodium chromate, the precipitation reaction is not irreversible. Although the protein can be precipitated in a neutral or acid solution, the protein will return to solution when the solution is basic. Hence, when the alkaline carrier or gelatinized portion is added to the ungelatinized adhesive on blending, the protein will return to solution and the final blend will exhibit the thixotropic property which renders it unsuitable for use.

It has now been found that an adhesive prepared by commingling fine mesh flour with a substantially proteolytic enzyme in an aqueous medium at such conditions of temperature and pH that the enzyme is proteolytically active will result in an adhesive which can be utilized in present corrugating equipment as a substitute for starch adhesives. The mixture of flour and proteolytic enzyme is maintained at a suitable temperature and pH for a period of time sufficient to effect the breakdown of a substantial portion of the protein fraction of the flour, which is believed to decompose into amino acids and peptides.

After the proteolytic activity of the enzyme has decomposed a substantial portion of the protein or zein in the flour, the pH of the mixture may be increased to a level at which the enzyme is deactivated. The mixture can now be utilized to form either the carrier or the ungelatinized portion of the final adhesive blend. If it is to be used to produce the carrier portion, the temperature of the mixture is increased at least to the gelatinization temperature of the starch fraction of the flour. The carrier portion is then blended with the ungelatinized, enzyme-treated flour portion and the blend, carrier and ungelatinized portion, utilized in boxboard manufacturing equipment in substantially the same manner as starch adhesive. The carrier portion of the final blend comprises a minor portion thereof, the ratio of ungelatinized to carrier portions being about 6 to 1.

The process thus set forth permits the utilization of Stein-Hall equipment without any major modifications of such equipment or the time cycle used in the Stein-Hall process. The primary difference is the treatment of the ungelatinized portion of the adhesive at a temperature of about 110° to 120° F. as opposed to 90° to 100° F. in the Stein-Hall process.

With regard to the flour which is utilized in lieu of starch according to the present invention, corn flour has been found to be advantageously adapted for such use.

A primary reason why corn flour has been found particularly suitable is because of the substantial economies which can be obtained by substituting it for starch. However, wheat flour, potato flour, tapioca flour, grain sorghum and other flour can also be used to advantage with the limitation that from an economic standpoint it would be improvident to utilize flour when corn starch was available at a lower price.

The flour which is mixed in an aqueous medium with an enzyme should be finely divided. Optimum size is such that 100% passes through a U.S. sieve #140, and at least 75% passes through a U.S. sieve #200. Flour which is sized to meet those specifications has been found to produce excellent results when commingled with a proteolytic enzyme. Flour which is not so finely divided will yield inferior results, apparently because the proteinaceous particles of the flour are not exposed to enzymic action due to protection by large starch particles. Satisfactory fine mesh flour can be obtained by means of several known methods, e.g., by bolting regular flour, by carefully fine grinding coarser flour to minimize mechanical starch breakdown, and by air classification of either regular or finely ground flour. The last-named technique has an additional advantage in that it reduces the protein level of the finely divided flour because of the selective separation which can be obtained through air classification. Parenthetically, in fine grinding flour, it has been found to be requisite that the temperature of the flour not be allowed to exceed about 150° F., so that gelatinization of the starch will not occur.

Several different enzyme preparations can be utilized in the process of the invention, provided that the enzymes are substantially proteolytic and have little amylolytic activity. Likewise, the enzyme used must be one which will attack the protein of the particular flour present. Where corn flour is used, for example, enzymes from animal, bacterial, fungal, or plant sources may be utilized. Enzymes such as bromalin, papain, trypsin, and ficin have been found particularly effective in breaking down the corn protein, apparently into a combination of non-interfering peptides and amino acids. Since a breakdown of the starch fraction of the flour is undesirable because it mitigates the adhesive characteristics of the adhesive blend, it is desirable that the enzyme or enzymes present have as little amylolytic activity as possible. However, a small amount of amylolytic activity in the enzymes, which activity will not effect a breakdown of a substantial portion of the raw starch fraction, will not be so undesirable as to render the enzyme completely unsuitable for use.

In accordance with a preferred embodiment of the invention the carrier and raw starch portions are prepared separately. The carrier portion is prepared by commingling fine mesh flour and one or more proteolytic enzymes in an aqueous medium, the flour being present in a major portion and the enzyme in a minor portion. Preferred ratios of flour to enzyme have been found to lie in the range of 800:1 to 1000:1. When the commingling step takes place at room temperature, the temperature of the medium is regulated by raising it to about 110° to 120° F., or to that temperature range at which the particular enzyme utilized is activated. The pH of the mixture is likewise regulated to that pH at which the enzyme is active. In regulating the temperature of the mixture, it is normally necessary to apply heat to bring the mixture into the optimum range of proteolytic activity. On the other hand, it is not necessarily required that the pH of the mixture be adjusted to the optimum range, since the pH of the mixture will normally be within that range. Therefore, as applied to the pH of the ungelatinized or carrier portions, the term, regulate, is intended to include lack of adjustment when the pH initially lies within the desired range as well as additions of base or acid to bring the pH within that range when it initially lies outside the desired range.

The mixture is held at this range for a period of time sufficient to convert almost all of the protein fraction of the flour to lower-weight molecules. This time will vary in accordance with the fineness of the mesh of the flour and the concentration of enzyme used. Generally it will be in the vicinity of 15 minutes to one hour. After the enzymic decomposition of the protein fraction has been completed, the pH of the mixture is increased, for example by the addition of a base such as sodium hydroxide. The increase in pH deactivates the enzyme, which is only active under certain conditions of temperature and pH. In addition, the caustic reduces the gelatinization temperature of the starch fraction of the flour and assists in obtaining a completely gelatinized fraction. Most proteolytic enzymes are active within a pH range of about 6.5 to 8.0, so that raising the pH to, e.g., 11.5 will stop all enzymic activity.

With the enzyme deactivated, the temperature of the carrier mixture is increased at least to the gelatinization temperature of the starch fraction of the flour and held at that temperature for a period of time sufficient to effect substantially complete gelatinization of that fraction. The gelatinization temperature to which the deactivated mixture is raised depends upon the amount of sodium hydroxide as well as the starch source used. Since gelatinization actually occurs over a temperature range rather than at a specific temperature, the mixture temperature should be raised to at least well within the gelatinization range. This range is 64° to 72° C. for corn starch, 56° to 67° C. for potato starch, and 69° to 75° C. for grain sorghum. During the gelatinization process the individual starch granules initially swell rapidly and then expand more slowly until their outlines become indistinct under the microscope. The swollen granules form a highly viscous paste which has excellent adhesive characteristics and in addition acts as a carrier for the raw or ungelatinized portion of the adhesive, the latter portion being separately prepared. After gelatinization of the starch fraction of the flour has been completed, the paste may be cooled and diluted by the addition of cold water.

The raw or ungelatinized portion of the adhesive is prepared by commingling fine mesh flour and proteolytic enzyme material in an aqueous medium and then digesting the mixture at a temperature and pH at which the enzyme is active. Preparation of the raw starch portion of the adhesive up to this point is carried out in substantially the same manner as the carrier portion of the adhesive, although it has been found advantageous to decrease the temperature, and consequently the activity, of the enzyme while maintaining the active enzyme in contact with the flour for a longer period of time. At the end of the period of enzymic digestion, borax is added to increase the adhesion of the blended adhesive to corrugated paper by softening the ungelatinized granules so that they will rupture more easily when subjected to the heat of the application roll of a boxboard machine.

It has also been found advantageous to introduce a small amount, say about 1%, of the dry flour weight of a fine mesh filler to stabilize the viscosity of the adhesive and improve the bonding strength thereof. One such product is that marketed by Minerals & Chemicals Corp. of America, Menlo Park, New Jersey, under the trademark "Attagel 20." Stabilization of the adhesive's viscosity improves its performance on the applicator roll and enables the degree of penetration of the adhesive into the corrugated medium to be determined more precisely.

The invention will be further illustrated by reference to the following specific examples of the practice of our process.

*Example I*

Fine mesh corn flour was obtained by bolting standard dry mill corn flour over 20 standard Dufour silk. The "thrus," which represented about 15% of the total flour weight, were collected. Adhesive was prepared from this material in two portions, a carrier portion and a raw starch portion.

The carrier portion was prepared by mixing 40 grams of the fine mesh flour, .05 gram of papain, and 0.4 gram of Attagel 20 in 200 mls. of water at 120° F. and maintaining the temperature of the mixture for 10 minutes. Then 6.3 grams of flaked sodium hydroxide dissolved in 10 mls. of water were added to the flour-enzyme mixture, and the resulting pH was about 11.5. The temperature of the mixture was then increased to 160° F., at which temperature it was held for 15 minutes to effect gelatinization of the starch fraction of the corn flour. The paste was cooled and diluted by the addition of 250 mls. of cold water.

The raw starch portion was prepared by mixing 250 grams of the fine mesh corn flour, 25 grams of Attagel 20, and .31 gram of papain in 730 mls. of water. The temperature was maintained at 120° F. for one hour, at the end of which time 8.7 grams of borax were added. To this raw starch portion the carrier portion was added with constant agitation over a period of 20 minutes.

*Example II*

Fine mesh wheat flour was obtained by hand brushing regular commercial wheat flour over a 200 mesh U.S. standard sieve. The "thrus," which represented about 80% of the total flour weight, were used in the preparation and the coarse material discarded. The adhesive was again prepared in two portions: a raw starch portion and a carrier portion.

The carrier portion was prepared by commingling 30 grams of the fine mesh flour with .23 gram of protease 30 enzyme and .33 gram of Attagel 20 in 250 mls. of water at 120° F. for 5 minutes. A solution of 6.2 grams of flaked sodium hydroxide dissolved in 10 mls. of water was added to the flour mixture, and the temperature of the mix increased to 160° F. After 15 minutes 200 mls. of cold water were added.

The raw starch portion was prepared by mixing 265 grams of the fine mesh flour, 1.7 grams of protease 30 and 2.5 grams of Attagel 20 in 750 mls. of water at a constant temperature of 120° F. After one hour 8.7 grams of borax were added. The carrier portion was then added to the raw starch portion with constant agitation over a period of 20 minutes.

The properties of the adhesive produced by treating fine mesh flour with a proteolytic enzyme as disclosed herein were similar to the properties of pearl starch adhesive and markedly different from the properties of adhesives prepared with conventional flour which had not been subjected to proteolytic enzymic activity. Whereas the conventional flour adhesive had a high viscosity and contained particles of curdled material, the adhesives produced in accordance with the present process had a low viscosity and were free-flowing. The amylographic viscosity of the enzyme-treated flour adhesive was 80 Brabender units at 50° C., compared to a reading of 60 units for pearl starch adhesives and 240 units for conventional flour adhesives. Furthermore, this viscosity remained constant even after the adhesive had been subjected to severe agitation for an extended period of time.

The gelatinization point of the adhesive prepared from enzyme-treated flour was fairly sharp, i.e., 63° to 66° C. This is comparable to the gelatinization range of pearl starch, but unlike the gelatinization range of corn flour adhesives, which extends from 58° to 72° C. Flour adhesive produced by means of the enzyme treatment disclosed herein does not "set back" rapidly on standing without agitation, as do conventional flour adhesives. To summarize, the enzyme-treated flour adhesive possessed the desirable characteristics of a pearl starch adhesive and had none of the undesirable characteristics of an adhesive produced from a conventional flour such as corn flour.

It will be apparent that such alterations and modifications as will occur to one skilled in this art may be made in the process and product described hereinbefore without departing from the scope of the invention. Such changes are desired to be included within the purview of the invention, which is to be limited only by the scope of the following, appended claims.

What is claimed is:

1. A process for the preparation of material adapted for use as an adhesive, comprising forming a carrier portion by commingling in an aqueous medium fine mesh flour having a starch fraction and a protein fraction with an enzyme which is substantially proteolytic and has little amylolytic activity, regulating the temperature and pH of the mixture so that the enzyme is proteolytically active, maintaining the mixture at said temperature and pH for a period of time sufficient to effect the breakdown of a substantial portion of the protein fraction of the flour, and thereafter increasing the temperature of the mixture at least to the gelatinization temperature of the starch fraction of the flour for a period of time sufficient to substantially completely gelatinize the starch fraction of the flour and form a viscous paste; separately preparing an ungelatinized starch portion; and then blending the carrier portion and the ungelatinized starch portion.

2. A process for the preparation of material adapted for use as an adhesive, comprising forming a carrier portion by commingling in an aqueous medium fine mesh flour having a starch fraction and a protein fraction with an enzyme which is substantially proteolytic and has little amylolytic activity, regulating the temperature and pH of the mixture so that the enzyme is proteolytically active, maintaining the mixture at said temperature and pH for a period of time sufficient to effect the breakdown of a substantial portion of the protein fraction of the flour, then increasing the pH of the mixture to deactivate the enzyme, and thereafter increasing the temperature of the mixture at least to the gelatinization temperature of the starch fraction of the flour for a period of time sufficient to substantially completely gelatinize the starch fraction of the flour and form a viscous paste; separately forming an ungelatinized starch portion; and blending the carrier portion and the ungelatinized starch portion.

3. A process as claimed in claim 1, in which said fine mesh flour is so divided that 100 percent passes through a U.S. Sieve No. 140 and at least 75 percent passes through a U.S. Sieve No. 200.

4. A process as claimed in claim 1, in which the temperature at which said enzyme is proteolytically active is about 110° to 120° F.

5. A process as claimed in claim 1, in which the temperature and pH of the mixture at which said enzyme is proteolytically active are about 110° to 120° F. and about 6.5 to 8.0, respectively.

6. A process as claimed in claim 2, in which the pH is raised above 8.0 to deactivate the enzyme.

7. A process as claimed in claim 6, in which said pH is raised to about 11.5 by the addition of sodium hydroxide.

8. A process for the preparation of material adapted for use as an adhesive, comprising forming a carrier portion by commingling in an aqueous medium fine mesh flour having a starch fraction and a protein fraction and so divided that at least 75 percent passes through a U.S. Sieve No. 200 with an enzyme which is substantially proteolytic and has little amylolytic activity, regulating the temperature of the mixture to a range of about 110° to 120° F. and the pH to a range of about 6.5 to 8.0 so that the enzyme is proteolytically active, maintaining the mixture at said temperature and pH for a period of time sufficient to effect the breakdown of a substantial portion of the protein fraction of the flour, increasing the pH of the mixture to above 8.0 to deactivate the enzyme, increasing the temperature of the mixture at least to the gelatinization temperature of the starch fraction of the flour to substantially completely gelatinize the starch fraction and form a viscous paste; separately forming an ungelatinized starch portion by commingling in an aqueosu medium fine mesh flour having a starch fraction and a protein fraction and so divided that at least 75 percent passes through a U.S. Sieve No. 200 with an enzyme which is substantially proteolytic and has little amylolytic activity, regulating the temperature and pH of the mixture so that the enzyme is proteolytically active, maintaining the mixture at said temperature and pH for a period of time sufficient to effect the breakdown of a substantial portion of the protein fraction of the flour; and then adding the carrier portion to the ungelatinized starch portion.

9. A process as claimed in claim 8, in which borax in an amount sufficient to increase the adhesion of the final adhesive is added to the ungelatinized starch portion after a substantial portion of the protein fraction has been broken down and prior to the addition of the carrier portion to the ungelatinized starch portion.

References Cited in the file of this patent

UNITED STATES PATENTS

| | | |
|---|---|---|
| 1,417,467 | Lenders et al. | May 23, 1922 |
| 1,582,537 | Prucha et al. | Apr. 27, 1926 |
| 2,466,172 | Kesler et al. | Apr. 5, 1949 |
| 2,607,359 | Oesting | Aug. 19, 1952 |
| 2,853,388 | Kiely et al. | Sept. 23, 1958 |
| 3,069,410 | Smith et al. | Dec. 18, 1962 |

FOREIGN PATENTS

| | | |
|---|---|---|
| 19,726 | Great Britain | 1908 |
| 182,829 | Great Britain | July 11, 1952 |

OTHER REFERENCES

Frieder: "Chemistry and Industry of Starch," Second Edition, 1950, page 597, TP415K41950 C.3.